Figure 1:
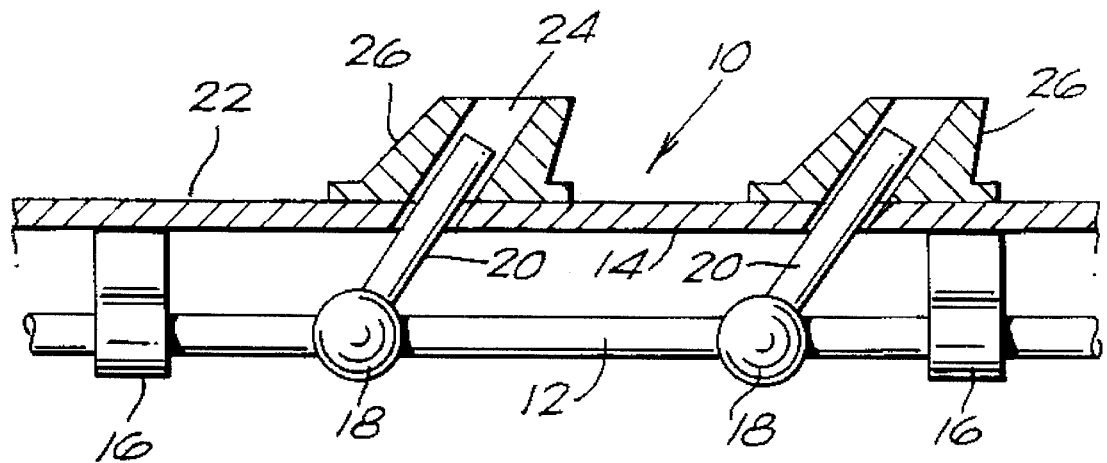

United States Patent [19]

Smith

[11] Patent Number: 5,542,624
[45] Date of Patent: Aug. 6, 1996

[54] LIGHTNING STRIKE PROTECTION

[75] Inventor: Henry R. Smith, Knightwick, England

[73] Assignee: HR Smith (Technical Developments) Ltd., Herefordshire, England

[21] Appl. No.: 252,080

[22] Filed: Jun. 1, 1994

[30] Foreign Application Priority Data

Jun. 3, 1993 [GB] United Kingdom ............... 9311422

[51] Int. Cl.$^6$ ................................................. B64D 45/02
[52] U.S. Cl. ...................................... 244/1 A; 361/218
[58] Field of Search .................................. 244/1 A, 121, 244/117 R; 361/212, 216, 217, 218, 220, 222

[56] References Cited

U.S. PATENT DOCUMENTS

| | | | |
|---|---|---|---|
| 2,333,975 | 11/1943 | Bennett | 361/218 |
| 3,428,270 | 2/1969 | Knight et al. | 244/1 A |
| 3,585,447 | 6/1971 | McLain | 361/218 |
| 5,159,521 | 10/1992 | Guangrun et al. | 361/218 |

*Primary Examiner*—Galen L. Barefoot
*Attorney, Agent, or Firm*—Bauer & Schaffer

[57] ABSTRACT

Lightning strike protection for an aircraft or part of an aircraft is provided by mounting metal (aluminium) rods adjacent but spaced from the inner surface of the aircraft wall. The rods are provided with ball joints from which extensions through the wall stand proud of the aircraft outer surface and within the material of static dischargers. The rods are coupled to bus bar which run the length of the aircraft in turn are coupled to lightning strike dischargers (again in the form of metal rods carried on but spaced from the wall of an aircraft and having extensions which pass through the aircraft wall). The application of the lightning strike protection system to radomes, antennas, pitot tubes carbon fiber reinforced plastics structures is discussed, in the former two cases metal rods being provided to extend in the null field of a device within the radome or the antenna. The mounting of the conductive rods spaced from the wall of the aircraft means that they make safely take surges of electromotive force caused by lightning strikes without damaging the fabric of the aircraft wall.

15 Claims, 4 Drawing Sheets

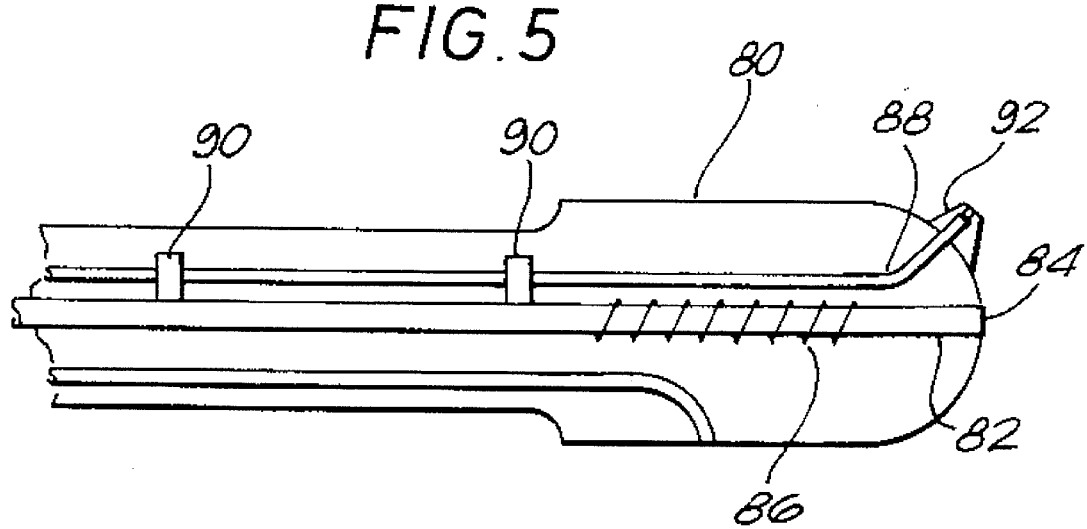

LIGHTNING STRIKE PROTECTION

DESCRIPTION

The invention relates to methods and apparatus for providing lightning strike protection, particularly for air vehicles.

Lightning strikes result from the breakdown of the electrical resistance of the insulating material (air) between two points or areas which are highly charged electrically and of opposite polarity. Lightning strikes may occur between highly charged clouds and the earth or between two highly charged clouds.

The need to protect buildings and vehicles from the effects of lightning strikes has been known for many hundreds of years.

Conventionally, buildings are protected from lightning strike by providing a continuous conductive metal bar or rod which runs from the uppermost point of the building to earth. Lightning which would otherwise strike the building is attracted to the electrically conductive rod and safely carried to earth.

More than a hundred years ago the provision of a similar arrangement for use in sailing ships was proposed and agreed to by the British Navy. The proposal was that, at times of electrical storms, chains be hung on the masts of ships and draped to the water—the chains acting as conductors for any lightning which might otherwise strike (and possibly damage) the mast of the ship and safely divert the strike to the sea.

An aircraft when flying may pass between two clouds or areas having high electric charges of opposite polarity and may form part of the path which an electrical discharge (lightning) may take.

In this case the lightning is particularly attracted to those areas of an aircraft which are of high curvature, for example edges of the wings and tail plane or fin and the nose of the aircraft where high potential gradients exist.

It is known that lightning is attracted to these points and in addition to providing structural strengthening of these areas attempts have been made to provide lightning diverters adjacent the points where lightning is most likely to strike. The diverters provide elements to which any lightning strike is attracted and which carry the impressed voltage of the strike away through the frame of the aircraft—so that it might be dissipated by lightning strike dischargers mounted at locations (usually on the trailing edges of the aircraft) where it is thought safe so to do.

In this way the effects of any lightning strike on an aircraft is diverted through the conductive airframe—protecting radar, radio and other electronic equipment carried in the aircraft—and the effects of possible local structural damage are reduced.

Many aircraft have fiber reinforced plastics structural parts in particular carbon reinforced plastics. These structures are often used to make the extremities, such as wings and tailplane, of an aircraft which develop the highest electrical pressures and are therefore most susceptible to lightning strike. Carbon fibers in reinforced structures are electrically conductive and are seriously damaged when subject to lightning strike.

In addition to carbon fiber extremities points on an aircraft which are particularly prone to lightning strike include those items of the aircraft equipment on the exterior of the airframe which are of metal and must necessarily have parts of high curvature. These include for example antennas carried on the aircraft, pitot tubes and the like and, in particular, any radar equipment carried in a radome on the nose of the aircraft.

Efforts have been made to overcome this problem as applied to air radio equipment by providing that the inner surface of any casing (for example a radome) used to protect the equipment has formed thereon conductive layers of material which extend from a position relatively close to the equipment to be protected back to the airframe itself.

These conductive tracks or layers formed on the surface of the casing attract any lightning strike to the conductive tracks and away from the equipment being protected.

A problem which has been found in such arrangements—particularly with radomes—is that the electromotive force generated in the conductive tracks carrying a lightning strike is so high that the tracks may be blown off the wall of the radome. This at best deleteriously affects the later functioning of the lightning diverter and at worst damages the structure of the radome and possibly the equipment the radome is protecting. No protection exists in the event of a second strike.

At present there is no way known to us by which antennas and pitot tubes mounted on the exterior of an aircraft may be adequately protected short of placing a lightning strike diverter of known form immediately adjacent the device. The placement of diverters of known form immediately adjacent radomes or antennas may have a deleterious effect on their performance.

When the potential voltage gradient becomes very large preceding a lightning strike, the stream of electrical ions will be discharged from the points of highest electrical potential. This stream of ions from unprotected metallic points produces extensive radio frequency signals which can couple into the radio systems carried in the aircraft and render them ineffective. The electrostatic dischargers fitted to metallic points of high electrical potential allow the current to flow without generating damaging radio frequency signals.

Objects of the invention include the provision of a lightning strike protection system, particularly for air vehicles, which alleviates and/or overcomes the disadvantages of the arrangements of lightning strike diverters presently known to us.

In one aspect the invention provides a lightning strike protection system for an aircraft or a part thereof, the system comprising at least one elongate electrical conductor mounted so as to extend adjacent to but spaced from an inner surface of a wall of said aircraft or said part, said conductor having one or more extensions running therefrom and passing through the wall to a position adjacent the outer surface of the wall.

Preferably, the or each conductor comprises a metal rod, beam or the like.

With advantage, that part of the or each extension on the outer surface of said wall is located within the material of a static discharger.

Desirably, the or each extension of said conductor is coupled to said conductor by a ball joint.

Advantageously, the system further includes one or more bus bars coupled to the or each conductor, the or each bus bar in turn being coupled to lightning strike discharger means.

The lightning strike discharger means may advantageously comprise at least one further elongate electrical conductor mounted so as to extend adjacent to and spaced from an inner surface of a wall of said aircraft or a part thereof, said further conductor having one or more extensions passing through said wall to a position adjacent the outer surface of the wall.

With especial advantage, the or each said conductor, and further conductor if provided, is held in position spaced from the inner surface of the wall of the aircraft or a part thereof by resilient, electrically non-conducting, clips or clamps.

Preferably, each said elongate conductor, and further conductor if provided, and said extensions thereof are formed from aluminium rods, said ball joints are of aluminium, and said clips holding the conductors in position are of an epoxy resin which has been glass-fiber reinforced.

A second aspect of the invention provides a lightning strike protection system as defined above in combination with a radome for an aircraft, the system comprising a plurality of metal rods each carried adjacent to but spaced from the inner surface from the radome, two of said rods extending in the null field of any radar device to be protected by the radome whilst others of said rods extend to a lesser extent along the inner surface of the radome out of the radar field, each said rod being provided with one or more spurs or extensions which extend through the radome wall to the outer surface thereof, the free end of each extension being located within the material of a static discharger.

A third aspect of the invention provides a lightning strike protection system as defined above in combination with an antenna, wherein a conductive metal rod is provided to extend through the antenna casing adjacent to but spaced from the antenna elements and located in the null field of the antenna, the end of the rod extending through the antenna casing to the exterior thereof, the free end of the metal rod being located within the material of a static discharger.

A fourth aspect of the invention provides a lightning strike protection system as defined above in combination with a pitot tube, the system comprising one or more metal rods extending along the body of the pitot tube, the end of the or each rod, or a spur or extension thereof, projecting through the outer surface of the pitot tube wall to a position adjacent the total head of the pitot tube, and wherein the end of the or each rod or spur or extension thereof on the outer surface of the pitot tube is located within the material of a static discharger.

Figure 2:
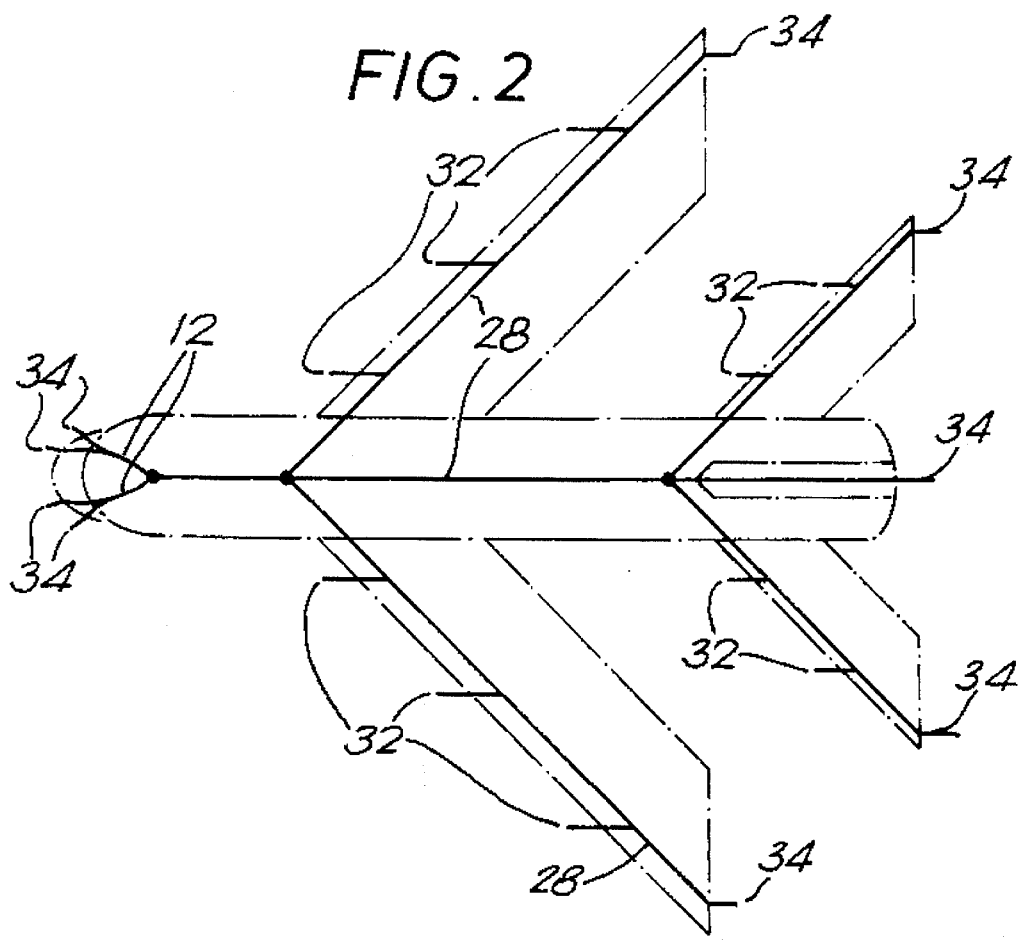
Figure 3A:
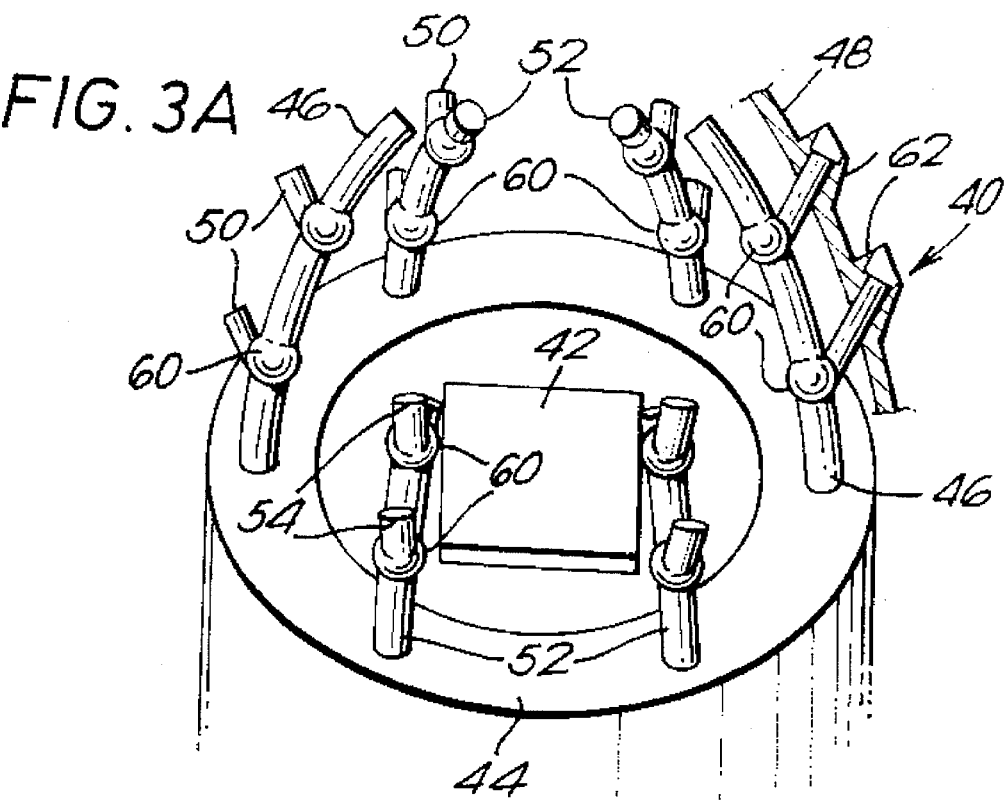
Figure 3B:
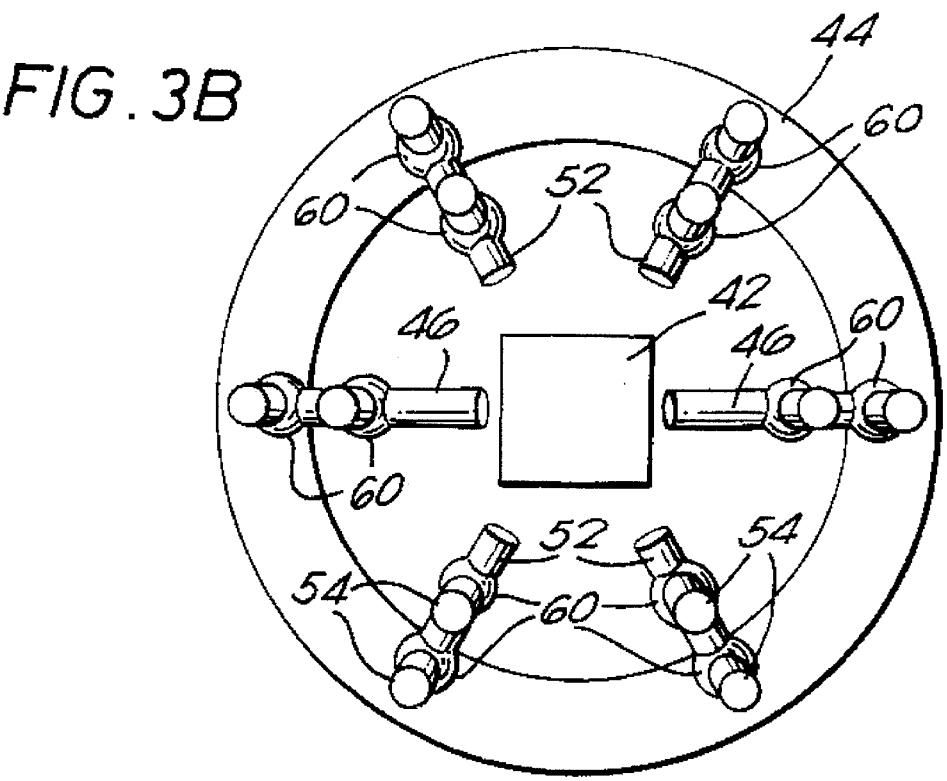
Figure 4A:
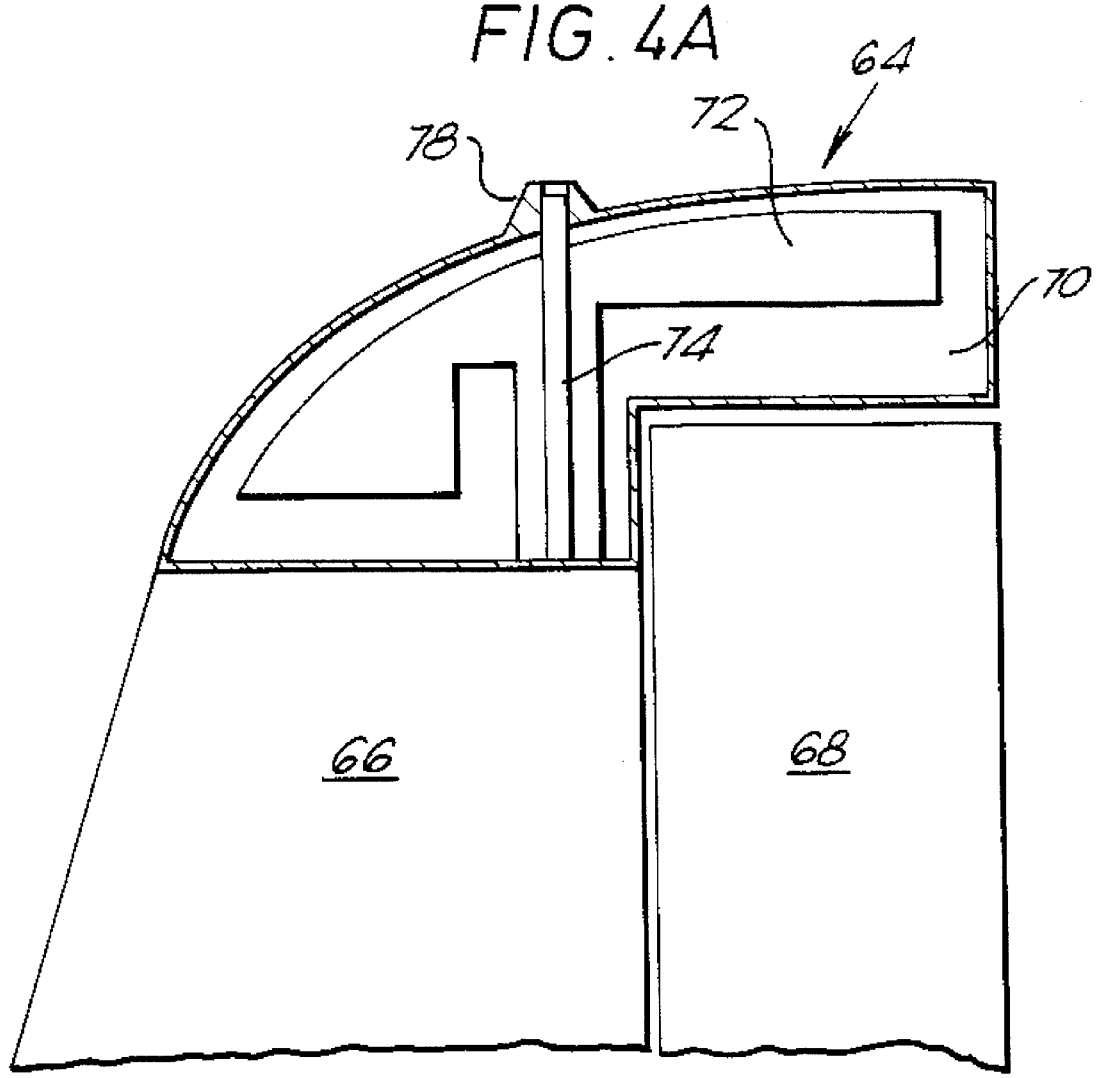
Figure 4B:
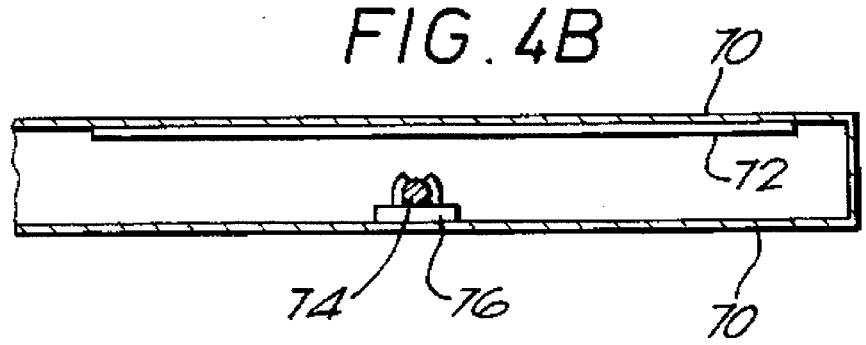

The above aspects, features and advantages of the invention will become more apparent from the following description of embodiments thereof, now made with reference to the accompanying drawings, in which:

FIG. 1 illustrates schematically the configuration of part of a lightning strike protection system embodying the invention, FIG. 2 schematically illustrates an aircraft including a lightning strike protection system as shown in FIG. 1, and embodying the invention, FIGS. 3a and 3b illustrate the system of FIGS. 1 and 2 applied to a radome, FIGS. 4a and 4b illustrates the system of FIGS. 1 and 2 applied to an antenna, and FIG. 5 illustrates the system of FIGS. 1 and 2 applied to a pitot tube.

With reference now to the drawings.

FIG. 1 shows the outer wall 10 of an aircraft to be protected from lightning strikes. The structure of the outer wall 10 of the aircraft is that of a radome, that is to say it is made from a dielectric structural material through which radar and radio signals can pass. The wall is typically of polyester, epoxy resin or other suitable fiber reinforced plastics material.

In accordance with an embodiment of the invention a circular-in-section aluminium rod 12 capable of carrying a lightning strike is positioned to run adjacent to but spaced from the inner surface 14 of wall 10. The aluminium rod 12 is preferably held spaced from the inner surface 14 of wall 10 by non-metallic, non-electrically conductive clips or clamps 16 of any suitable form. The clips are preferably of resin glass-fiber reinforced material.

The rod 12 in this embodiment is said to be circular in section and typically has a cross sectional area of 15 mm$^2$; any suitable conductive metal may be used to form the rod and it may, of course, have any other section capable of carrying lightning strikes without being damaged.

Along its length rod 12 is provided with a series of balls 18 each having an aluminium extension or spur 20 extending therefrom, as shown in FIG. 1, through wall 10.

The aluminium extensions or spurs 20 are typically 5 cm long, circular in section and have a cross sectional area of, preferably, 15 mm$^2$.

On the outer surface 22 of wall 10 each spur 20 extends upwardly through a centrally formed aperture 24 into which the spur fits in an electrostatic discharger 26.

The electrostatic dischargers 26 are mounted in a conventional manner on the outer surface 20 of wall 10.

It is to be noted that the outermost end of each spur 20 is cut normally of its longitudinal axis and lies within the central aperture 24 of its associated discharger 26—that is to say the spur 20 stops before the outermost end of the discharger.

In normal use the electrostatic dischargers 26 act to discharge static electricity built up on the aircraft in accordance with their design at, say, 12–20 KV.

The spur 20 will not discharge static electricity, however, should the aircraft be subject to lightning strike the lightning will be attracted towards the spur 20, especially in view of the high curvature of its free end and as the region the spur 20 is at a raised potential voltage caused by the action of discharger 26.

The lightning strike will be carried down the aluminium spur 20 into ball 18 and thereafter along rod 12. The provision of the ball 18 more readily enables a lightning strike in spur 20 to be carried into the rod 12.

As rod 12 is spaced from the inner surface 14 of the wall 10 any electromotive force generated in it by passage therethrough of the lightning strike will not act to force the rod away from the wall.

These forces may have the effect of moving the clips 16, however, as noted the clips are generally resilient and are not adversely affected by such movement.

It is further proposed that the spurs 20 with their protective static dischargers 26 will be fitted to all points 32 (see FIG. 2) on the outer surface of the aircraft having high electrical pressure—being points to which lightning strikes might attach—and that these points be coupled through the aircraft by the rods 12 and a bus bar arrangement 28 having sufficient cross section (typically 15 mm$^2$ or more) to carry the strike current away from the point of attachment. Bus bar arrangement 28 carries that electrical current to one or more exit points 34 on the aircraft so that the electrical current of the lightning strike is carried through the arrangement of the present invention thereby preventing damage to the aircraft structure.

The points 32 of high electrical pressure—where there is a high likelihood of lightning strike—are generally at the leading edges of the aeroplane and the arrangement of the present invention carries the current in any lightning strike to an exit point or points 34 where there is a low likelihood of lightning strike and at which the strike may be dissipated or discharged to atmosphere (these points are generally at the trailing edges of the aircraft).

The application of embodiments of the invention to various items of airborne equipment will now be described.

FIG. 3 illustrates a radome housing a radar device and shows at A a perspective view of the radome and at B a plan view of the elements therein.

In FIG. 3 the radome housing or wall is generally shown at 40 and the active radar device at 42—both mounted on a ground plane or ring 44.

In this embodiment two circular-in-section, aluminium lightning strike protection rods 46 are provided to extend generally parallel to but spaced from the inner surface of the radome wall and in a plane at right angles to the electric field (in the null field) of the radar equipment 42. The uppermost ends of the rods 46 do not extend into the bore sight of the radar equipment (that is to say do not extend into the plane defined by a cone angle of approximately 30° measured from the center of the radiating elements) and are spaced approximately 30 cm apart Each rod 46 is provided with two spurs as shown.

Four further circular-in-section, aluminium rods 52 are provided equi-spaced around the ground plane 44 (that is to say the angular spacing of the rods 46 and 52 provided is approximately 60°) and rods 52 again extend upwardly parallel to but spaced inwardly of the radome wall 48.

The additional rods 52 carry spurs 54 and extend to the height of the plane defined by the 140° radiation angle of the radar element 42—which is the cone angle, measured from the center of the radiating elements, and below which radiation does not occur.

As with the arrangement described with reference to FIG. 1 the spurs 48 and 52 are coupled to the rods 46 and 50 by balls 60.

Each spur 48 or 52 extends through the radome 48 and its outer end is shrouded by an electrostatic discharger 62 as shown.

The particular configuration described for the rods 46 and 52 means that they do not interfere with the effective operation of the radar element 42. At the same time they provide significant lightning strike protection for the radome.

The ground plane or ring 44 is coupled to bus bars as described with reference to FIG. 2.

FIG. 4 illustrates the system of the invention applied to an antenna, showing at A and B respectively sectional side and plan views of a VHF fin antenna as provided on some aircraft.

The Figure shows the antenna indicated generally at 64 mounted on the upper edge of an aircraft fin 66 which carries a rudder 68. Within the antenna casing 70 the antenna radiating elements are provided as shown at 72.

Additionally, in accordance with this embodiment of the invention there is provided extending up from the base of the antenna 64 an aluminium rod 74 which runs along side, but is spaced from the antenna radiating elements 72. Rod 74 is held in position within the antenna casing by electrically non-conductive clips 76 which act to space the rod both from the antenna radiating elements 72 and the casing 70.

The positioning of the rod 74 in the antenna casing is carefully selected such that it lies in the null field of the antenna.

After passing through the upper parts of the casing 70 the rod 74 terminates, as described previously with reference to the arrangement shown in FIGS. 1 and 2, in an electrostatic discharger 78. The lower end of the rod 74 is coupled to a bus bar arrangement described with reference to FIG. 2.

An embodiment of the invention as applied to a pitot tube device is described with reference to FIG. 5 which shows the device in section.

The device body 80 is formed of a non-electrically conductive material (for example an epoxy resin glass-fiber reinforced material) and has a number of conduits formed therein leading to vents or apertures on its surface. One of these conduits, indicated at 82, leads to the total head tube 84 of the device and is surrounded along at least part of its length by an electrical heating coil 86.

This device will normally be provided to extend in front of an aircraft such that the total head tube 84 is the leading part of the aircraft. As such the coil 86 would normally act to attract lightning to the device.

In accordance with this embodiment, however, the device is provided with a number of aluminium rods 88 (only one of which is shown) which extend the length of the device adjacent the main conduit 82 therein. The rods 88 are carried supported on the wall of the conduit 82 by electrically non-conductive clips 90. The rods are carried adjacent to but spaced from the wall of the positioning of the electrical heating coil 86.

The outermost end of each rod 88 (or a spur carried thereon) extends through the wall of the device and terminates, as described above, within the central aperture of an electrostatic discharger 92.

That end of rod 88 spaced from the total head of the pitot tube is, again, coupled to a bus bar arrangement as shown in FIGS. 1 and 2.

It will be seen in the arrangement that the outermost ends of the rods 88 "lead" the coil 86 provided in the device and lightning will preferentially be attracted to them rather than the coil 86.

In the arrangements shown and described with reference to the FIGS. 3, 4 and 5 the spurs and metal rods may be as described with reference to the arrangements in FIGS. 1 and 2—that is to say be circular in section, of typically 15 mm² cross section of area and be of aluminium. It will be appreciated, however, that the materials forming these parts may be selected from any suitably conductive material, that the cross sectional area may be larger if desired and that the shape of the members in cross section may be selected to be other than circular.

Again it will be appreciated that the clips used in the arrangement shown and described with reference to FIGS. 3, 4 and 5 may be similar to the clips shown in the arrangements of FIGS. 1 and 2 or be of any other suitable form and material.

It will further be seen in each of the described arrangements of lightning strike protection system embodying this invention there is provision for the diversion of lightning strikes away from parts (the radar element 42 in the arrangement of FIG. 3, the antenna elements 72 in the arrangement of FIG. 4, and the coil 86 in the arrangement of FIG. 5) to which lightning would otherwise be attracted—without adversely affecting operation of those parts. Again, the described arrangements provide that the conductive rods used to carry the lightning strikes run spaced from the walls on which they are mounted substantially decreasing the damaging effects of electromotive forces in the rods when they divert a lightning strike.

I claim:

1. A lightning strike protection system for an aircraft or a part thereof, which system comprises at least one elongate electrical conductor mounted so as to extend adjacent to but spaced from an inner surface of a wall of said one aircraft or said part, said conductor having one or more extensions running therefrom and passing through said wall to a position adjacent the outer surface of said wall, wherein that part of the or each extension on the outer surface of said wall is located within the material of a static discharger.

2. A system as claimed in claim 1, wherein the or each extension of said at least one conductor is coupled to said conductor by a ball joint.

3. A system as claimed in claim 2, further including at least one bus bar coupled to said at least one conductor, said at least one bus bar in turn being coupled to lightning strike discharger means.

4. A system as claimed in claim 3, wherein said lightning strike discharger means comprises at least one further elongate electrical conductor mounted so as to extend adjacent to and spaced from an inner surface of a wall of said aircraft or said part thereof, said at least one further conductor having one or more extensions passing through said wall to a position adjacent the outer surface of said wall.

5. A system as claimed in claim 1, wherein the or each conductor comprises a metal rod or beam.

6. A system as claimed in claim 4, wherein the or each conductor comprises a metal rod or beam.

7. A system as claimed in claim 1, wherein the or each said conductor, is held in position spaced from the inner surface of the wall of the aircraft or a part thereof by resilient, electrically non-conducting, clips or clamps.

8. A system as claimed claim 6, wherein the or each said conductor is held in position spaced from the inner surface of the wall of the aircraft or a part thereof by resilient, electrically nonconducting, clips or clamps.

9. A system as claimed in claim 8, wherein said elongate conductors said extensions thereof and said ball joints are made of aluminium, and wherein said clips holding the conductors in position are of plastics material.

10. A lightning strike protection system for a radome for an aircraft, the system comprising a plurality of metal rods each carried adjacent to but spaced from the inner surface from the radome, two of said rods extending in the null field of a radar device to be protected by the radome whilst others of said rods extend to a lesser extent along the inner surface of the radome out of the radar field, each said rod being provided with one or more spurs or extensions which extend through the radome wall to the outer surface thereof, the free end of said extension being located within the material of a static discharger.

11. A lightning strike protection system as claimed in claim 10, wherein each said metal rod is held in position spaced from the inner surface of the wall of the radome by resilient, electrically nonconducting clips or clamps.

12. A lightning strike protection system for use with an antenna for an aircraft, the system comprising a conductive metal rod provided to extend through the antenna casing adjacent to but spaced from the antenna elements and located in the null field of the antenna, the end of the rod extending through the antenna casing to the exterior thereof, and being located within the material of a static discharger.

13. A lightning strike protection system as claimed in claim 12, wherein said metal rod is held in position spaced from the inner surface of the wall of the antenna by resilient, electrically nonconducting clips or clamps.

14. A lightning strike protection system for use with a pitot tube for an aircraft, the system comprising one or more metal rods extending along the body of the pitot tube, the end of the or each rod projecting through the outer surface of the pitot tube wall to a position adjacent the total head of the pitot tube, and wherein the end of the or each rod on the outer surface of the pitot tube is located within the material of a static discharger.

15. A lightning strike protection system as claimed in claim 14, wherein the or each said metal rod is held in position within the pitot tube by resilient, electrically nonconducting clips or clamps.

* * * * *